United States Patent
Moore (10) Patent No.: US 7,685,764 B2
(45) Date of Patent: *Mar. 30, 2010

(54) LANDSCAPING RINGS AND RELATED MANUFACTURING METHODS

(75) Inventor: Richard C. Moore, Charleston, SC (US)

(73) Assignee: Easy Gardener, Inc., Waco, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/680,339

(22) Filed: Feb. 28, 2007

(65) Prior Publication Data

US 2008/0202023 A1 Aug. 28, 2008

(51) Int. Cl.
*A01G 13/02* (2006.01)
(52) U.S. Cl. .................................. 47/9; 47/32
(58) Field of Classification Search ............... 47/32, 47/9, 902, 31.1, 32.4, 33, 58.1 SE, 56; 404/32, 404/33
See application file for complete search history.

(56) References Cited

U.S. PATENT DOCUMENTS

| | | | |
|---|---|---|---|
| 4,792,257 A | 12/1988 | Rinninger | |
| 4,794,726 A * | 1/1989 | Fawcett et al. | 47/9 |
| 5,396,731 A | 3/1995 | Byrne | |
| 5,509,231 A | 4/1996 | Marcoux | |
| 5,522,176 A | 6/1996 | Suttle | |
| 5,714,219 A | 2/1998 | Mashunkashey et al. | |
| 5,910,514 A | 6/1999 | Greenberg et al. | |
| 6,640,490 B1 | 11/2003 | Boehringer | |
| 2003/0093966 A1* | 5/2003 | Chang | 52/604 |
| 2006/0032125 A1* | 2/2006 | Kruer et al. | 47/59 R |

OTHER PUBLICATIONS

U.S. Appl. No. 11/742,809, filed May 1, 2007, entitled "Stepping Stones Manufactured from Recycled Products".

* cited by examiner

*Primary Examiner*—T. Nguyen
(74) *Attorney, Agent, or Firm*—Turner Padget Graham & Laney, P.A.

(57) ABSTRACT

Methods of manufacturing multi-colored mulch pads include providing a mold; mixing together a rubber component, a binder and a first coloring agent to form a matrix having a first colored surface; and introducing a second coloring agent onto the matrix to create a multicolored skirt having a second colored surface opposite the first colored surface.

14 Claims, 8 Drawing Sheets

FIG. 8

LANDSCAPING RINGS AND RELATED MANUFACTURING METHODS

BACKGROUND OF THE DISCLOSURE

In order to beautify lawns, gardens and other outdoor grounds, natural mulching systems, such as natural bark, wood products, peat, and the like are well known for mulching around trees, plants and other items. Although these natural mulching systems inhibit weed and grass growth and present a manicured appearance, these systems require continual care and replenishment. Also, the initial preparation and continuing care are expensive so many trees go unprotected for at least some time, or the mulch is not maintained. Either situation leaves the trees subject to damage when grass and weeds growing near the trees are trimmed or mowed.

Moreover, natural mulching systems must be periodically replenished due to both natural and mechanical degradation; e.g., hard rains, winds and even watering may flush away the mulch, leaving the ground and root system thereunder subject to erosion from water force and other environmental conditions. Certain natural mulch systems may also tend to hold water themselves and not pass it to the underlying roots or drain the water away from the roots by capillary action.

Accordingly, synthetic mulch systems have been used around trees and plants to inhibit weed and grass growth near the trees and plants in order to eliminate the need for close-in trimming and mowing. Preferably, these synthetic mulch systems present a desired aesthetic appearance but most importantly, these systems must be able to transmit air and water to the underlying root systems and not draw water away from the roots, which could kill the trees and plants.

In U.S. Pat. No. 5,396,731 Byrne describes a recycled rubber mulching system, which includes mulch pads for protecting trees and plants and their root systems. These mulch pads protect trees from damage that may be caused flexible line trimmers used by property owners to trim grass and weeds from around tree bases. Trimming too closely around a tree trunk can cause a trimmer line to contact the trunk and destroy the tree bark and may even kill the tree. Likewise, mowing too closely to trees and plants may cause harm, particularly if the mower strikes a tree and destroys its bark. Similarly, trimming too closely to other objects, such as siding, posts, grave markers and the like can also damage those objects. Thus, the Byrne mulch pad protects trees and other objects from trimming lines and mowers while simultaneously providing aeration and water to underlying root systems but preventing weed and grass growth under the mulch pad.

Although Byrne teaches controlling color and sheen in a mulch pad in order to produce the mulch pad with a natural mulch appearance, the Byrne mulch pad is one color depending on the coloring agent used when manufacturing the mulch pad. Not only does this present consumers with limited choices, but single-color mulch pads are not cost effective. More specifically, some businesses and homeowners may desire brown mulch pads while others may prefer red mulch pads and still others desire a different color to achieve various landscape effects. Thus, the typical home improvement or lawn and garden store must stock a supply of each color of mulch pad. Each stack of different colored mulch pads requires use of finite floor space. Since floor space is limited and includes inherent costs to use, the consumer is faced with a limited selection of mulch pads—perhaps a choice of two colors—or the consumer must pay more for the store to utilize additional floor space to stock a greater selection of mulch pads.

A multi-colored mulch pad is needed in the lawn and garden care industry to utilize premium floor space more efficiently to reduce costs and to increase consumer choice.

BRIEF SUMMARY OF THE DISCLOSURE

The present disclosure is directed in general to multi-colored rings (also referred to herein as pads, mats or skirts) for use about tree trunks, shrubbery, posts, poles and the like to protect them from trimming lines and mowers. In the case of live foliage, the rings also simultaneously provide aeration and water to underlying root systems but prevent weed and grass growth under the rings.

The multi-colored rings are made, for example, by recycling a waste product such as used rubber tires, which benefits the environment. The rings may be colored brown on one of their sides and red on their opposite sides. Accordingly, a home improvement store, garden store or the like need only use one section of limited floor or shelf space and still be able to offer a choice of at least two colored rings to consumers. Thus, while one consumer may want a brown tree ring and another consumer may want a red tree ring, both consumers may each purchase one of the brown-red rings and simply place the desired color facing up around their respective trees. Moreover, where the store had offered previously only a choice of brown and red rings each occupying a section of floor or shelf space, the store can now offer another color combination such as rings having green on one side and black on the other, thus doubling consumer choices in this example to four colors using the same two sections of floor or shelf space.

Evident from the foregoing introduction, the component parts and ingredients of the multi-colored rings are simple and economical to manufacture and use. Other advantages of the invention will be apparent from the following description and the attached drawings or can be learned through practice of the invention.

According to an exemplary process of the present disclosure, a mold is manufactured to half the desired thickness of the finished product. Rubber is mixed with binder and pigment. The resultant mixture is weighed and placed into the mold then smoothed and leveled in the mold. The compacted mixture is conveyed to a second mixing station, and a ring with an inside diameter equal to the outside diameter is placed over the first mold. The top ring may have a ledge protruding inward to facilitate seating the top ring onto the mold. A second color is poured into the mold, compacted and cured. After curing, the top ring is removed and the finished product extracted from the mold. Finished rings are packaged for shipping and sale.

In producing functionally useful pads, it is also desirable that the pads have a natural aesthetic appearance; i.e., an indigenous organic mulch-like appearance. However, rubber tire particles are typically coal black, while the binder coating them typically is clear, or may be yellowish in appearance. Frequently, such binder/granule mix, when cured, may have an undesirable color and/or sheen or gloss. Accordingly, the disclosure provides a mulch system from ground-up, waste rubber and a binder, and means for controlling the appearance of the cured mulch mat to provide desirable color and aesthetics.

Specifically, to produce pads according to an aspect of the disclosure, a binder (e.g., urethane) is utilized and is mixed together with pigment to provide a desirable color. This binder-pigment mixture is mixed with a catalyst to promote curing and with the ground rubber and fibers. This mixture is then molded into a desired shape and a diatomaceous earth or silica is sprinkled over the uncured mixture to produce a desirable anti-gloss effect in the cured pad so produced.

The mulching system provided by the disclosure provides numerous advantages. When used around a tree, it prevents grass and weed growth around the trunk, thus making it unnecessary to trim or mow closely thereto. At the same time, it provides a relatively inexpensive, natural appearing mulch system with little, if any, continuing maintenance needed. At the same time, the mulch system is porous, transmitting moisture and air to the root system, both facilitating its nourishment and insulating it.

While the pad transmits air and moisture, its voids, between the bound rubber granules and fibers, do not operate as capillaries, pulling water away from the root system. Instead, the pad insulates the root system and retains water and-condensate beneath the pad for benefit of the root system.

It will also be appreciated that the pad provides erosion protection for the underlying soil and root system. For example, even a high velocity stream of water directed against the pad will, by the time the water travels through the pad, be broken down into low velocity droplets. This serves to disperse fluid energy, and prevents soil erosion while the pad does not mechanically degenerate and remains in place, reducing maintenance concerns. Not only does the pad transform high velocity water streams into a plurality of dispersed water droplets, but it will be appreciated that the pad disperses the water laterally through the pad for greater overall moisture coverage.

According to another aspect of the disclosure, an elastomeric mulch pad includes a first side being configured for contacting an area about an object, the first side having a first color; a second side opposing the first side and defining a hole therethrough, the second side being configured for contacting the area about the object, the second side having a second color different from the first color; a peripheral edge defined by the first and second sides; a slit extending from the peripheral edge to the hole, the slit being configured to twist apart to position the object in the hole, the slit being rejoinable to dispose the mulch pad around the object and to exhibit a seamless appearance thereabout; wherein each of the first and second sides include a plurality of rubber components and a binder holding the rubber components together, the mulch pad being porous to moisture and air but configured to inhibit growth of grass and weeds disposed under one of the sides in the area about the object. In this aspect, the object may be a tree, a shrub, a pole, a post or the like.

In this aspect of the disclosure, the mulch pad may be a circular-shaped skirt or a star-shaped skirt. Moreover, the first and second colors may be red, white, brown, green, blue, or black, with the first color being different from the second color. The first and second colors are derived from respective coloring pigments.

Also in this aspect of the disclosure, the peripheral edge of the mulch pad has a thickness of about 0.5 inches to 1 inch, and the slit is non-linear from the peripheral edge to the hole.

Further, the rubber components in this aspect may be a plurality of rubber buffings, a plurality of rubber granules and combinations of these. One of the first and second sides may be made of rubber buffings and the other side may be made of rubber granules. The rubber buffings may be about one-half (0.5) inches to about three (3) inches in length and about one-quarter (0.25) inches to about one (1) inch in width. The first side and the second side may also have different textures.

Also in this aspect of the disclosure, the binder may include moisture curable urethane. The elastomeric mulch pad may also include fibers derived from used rubber tires, a curing catalyst, an anti-gloss agent, and/or diatomaceous silica to facilitate a natural bark mulch appearance.

According to another aspect of the disclosure, a method of manufacturing a multi-colored mulch pad may include providing a mold; mixing together a rubber component, a binder and a first coloring agent to form a matrix having a first colored surface; and introducing a second coloring agent onto the matrix to create a multicolored skirt having a second colored surface opposite the first colored surface. The mold may have a height of about one-half inch to about one inch, the height being about half a desired thickness of the skirt. The mold may also have a diameter of about twenty inches to about forty inches.

Also, the method in this aspect may include leveling the rubber component, the binder and the first coloring agent. The method may also include curing the rubber component, the binder and the first coloring agent. The curing may be accomplished by heat, compression, adhesive, and combinations thereof.

The method in this aspect may also include mixing a plurality of fibers with the rubber component, the binder and the first coloring agent. The method may also include mixing a catalyst with the rubber component, the binder and the first coloring agent. The method may further include leveling the second coloring agent. The method may also include curing the second coloring agent.

Further, the method may include joining the mold with a ring. The mold may have a peripheral lip and a projection, the projection depending from the peripheral lip. The ring may have a ledge defining a shoulder, the projection and the ledge complimentarily shaped to seat the ring and the mold together.

The method in this aspect may also include embossing one of the first and second colored surfaces such that each surface has a different texture.

According to this aspect of the disclosure, the rubber component of the matrix may include a plurality of buffings, and the method may further include introducing an additional matrix comprising a second coloring agent and a plurality of rubber granules onto the matrix with the plurality of buffings to create a multicolored skirt having a second colored surface opposite the first colored surface.

Accordingly, pads or mats of the composition according to the present disclosure can be used over ground to prevent erosion, such as on hillsides, under downspouts, in walk areas, steps and the like, and due to the multiple colors, the pads save storage and sales space with one multicolored pad being attractive to different consumers having different landscaping needs.

BRIEF DESCRIPTION OF THE DRAWINGS

The above and other aspects and advantages of the present invention are apparent from the detailed description below in combination with the drawings, in which.

DETAILED DESCRIPTION OF THE DISCLOSURE

Detailed reference will now be made to the drawings in which examples embodying the present disclosure are shown. The detailed description uses numerical and letter designations to refer to features of the drawings. Like or similar designations of the drawings and description have been used to refer to like or similar parts of various embodiments according the disclosure.

The drawings and detailed description provide a full and detailed written description of the disclosure and of the manner and process of making and using various embodiments, so as to enable one skilled in the pertinent art to make and use them, as well as the best mode of carrying out the disclosure. However, the examples set forth in the drawings and detailed description are provided by way of explanation of the disclosure and are not meant as limitations of the disclosure. The present disclosure thus includes any modifications and variations of the following examples as come within the scope of the appended claims and their equivalents.

Turning now to the figures, a tree or plant skirt (alternatively, "mat", "pad" or "ring") is designated in general by the element number 10 as broadly embodied in FIGS. 1-4. In general, the skirt 10 is manufactured by grinding used automobile tires, or other sources of recyclable rubber, into constituent rubber and fiber elements that are combined with a curable binder to form a matrix to define a moisture and air porous, weed and grass-growth preventive skirt. Exemplary processes for manufacturing the skirt 10 are described in greater detail below with respect to FIGS. 5-7.

Figure 1:
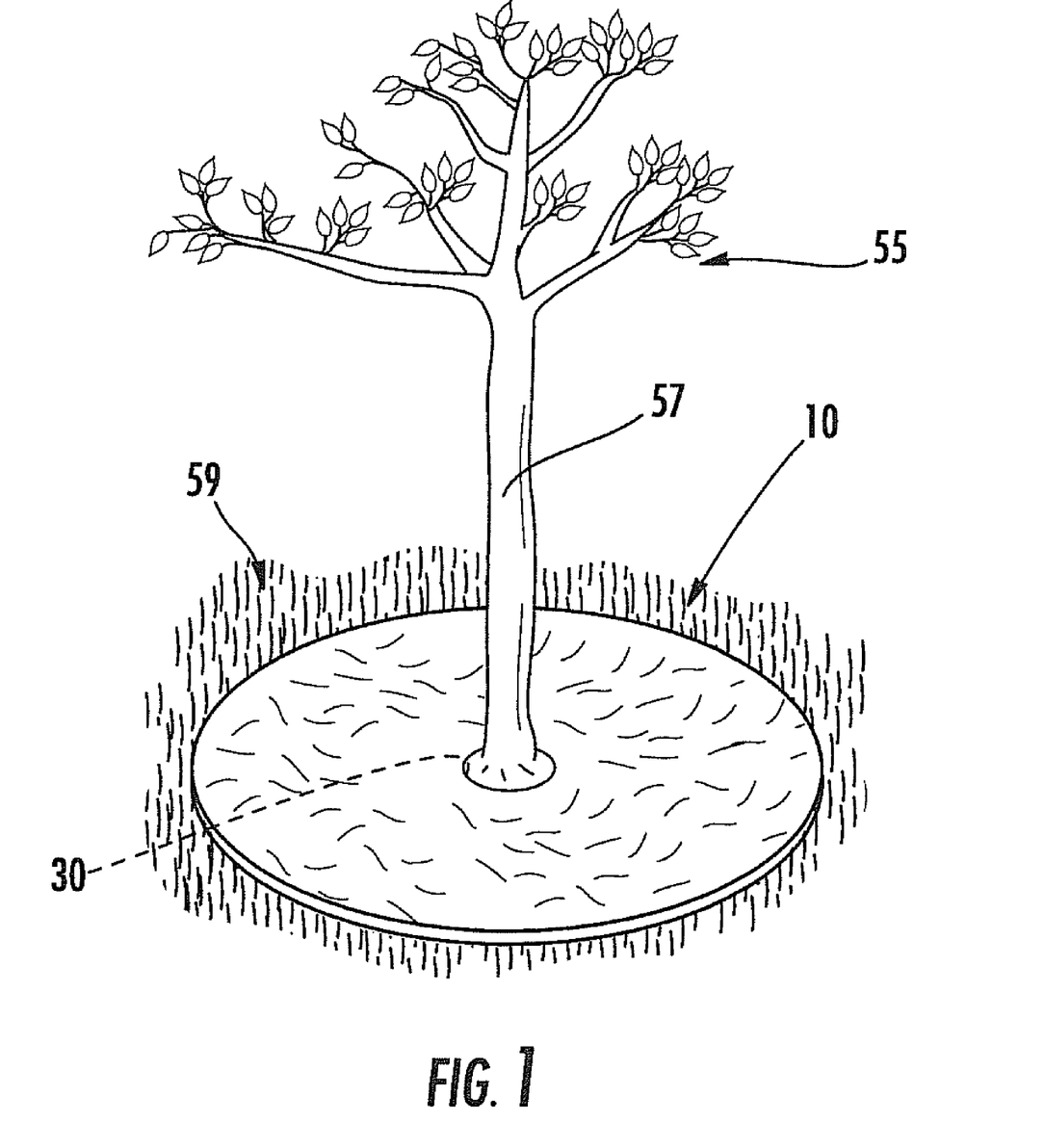
FIG. 1 is a perspective view of one embodiment of a ring in an intended use according to an aspect of the disclosure.
Figure 8:
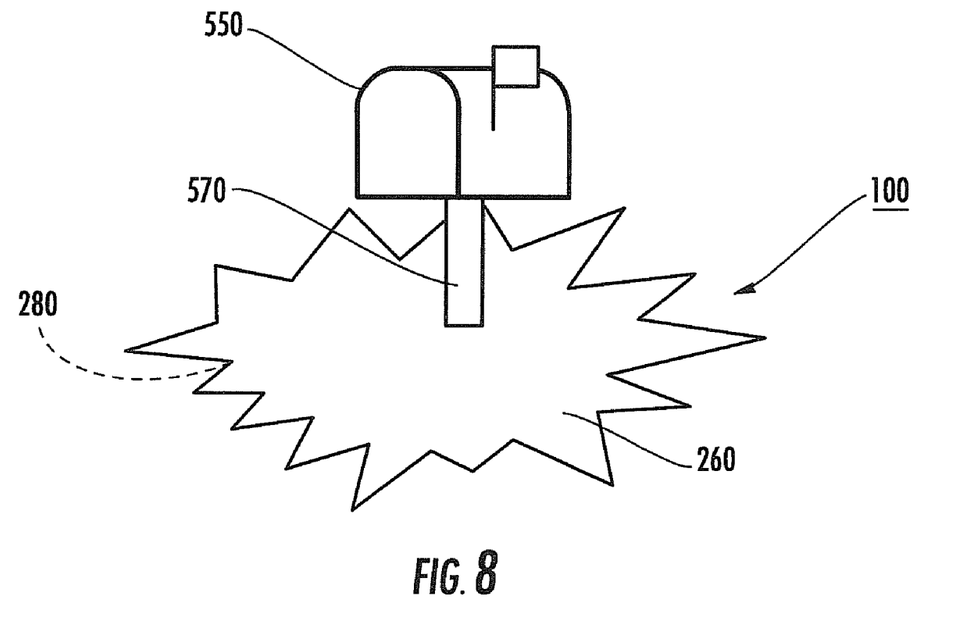
FIG. 8 is an elevational view of another embodiment of a ring in an intended use according to another aspect of the disclosure.

With particular reference to FIG. 1, the porous skirt 10 is shown in use positioned at ground level around a trunk 57 of a tree 55. A hole or aperture 30 is formed in the skirt 10, and the tree trunk 57 extends through the hole 30. As shown, grass 59 grows around but not through the skirt 10. Thus, a property owner need not risk harming the trunk 57 by trimming or mowing near the trunk 57 since the skirt 10 renders such close-in trimming unnecessary. Although the skirt 10 is shown in the shape of a ring or circle in this example, the skilled artisan will appreciate that the skirt 10 can be manufactured in various shapes as desired, such as a irregular or star-shaped skirt 100, shown for example in FIG. 8. Furthermore, the skirts 10, 100 can be used around foliage other than trees, such as around shrubs, or around posts or poles, such as mailbox posts, light poles and other inanimate objects to protect wooden or painted surfaces as shown in FIG. 8. Thus, the skirts 10, 100 are not limited to the exemplary shapes and uses depicted in the figures.

Figure 2:
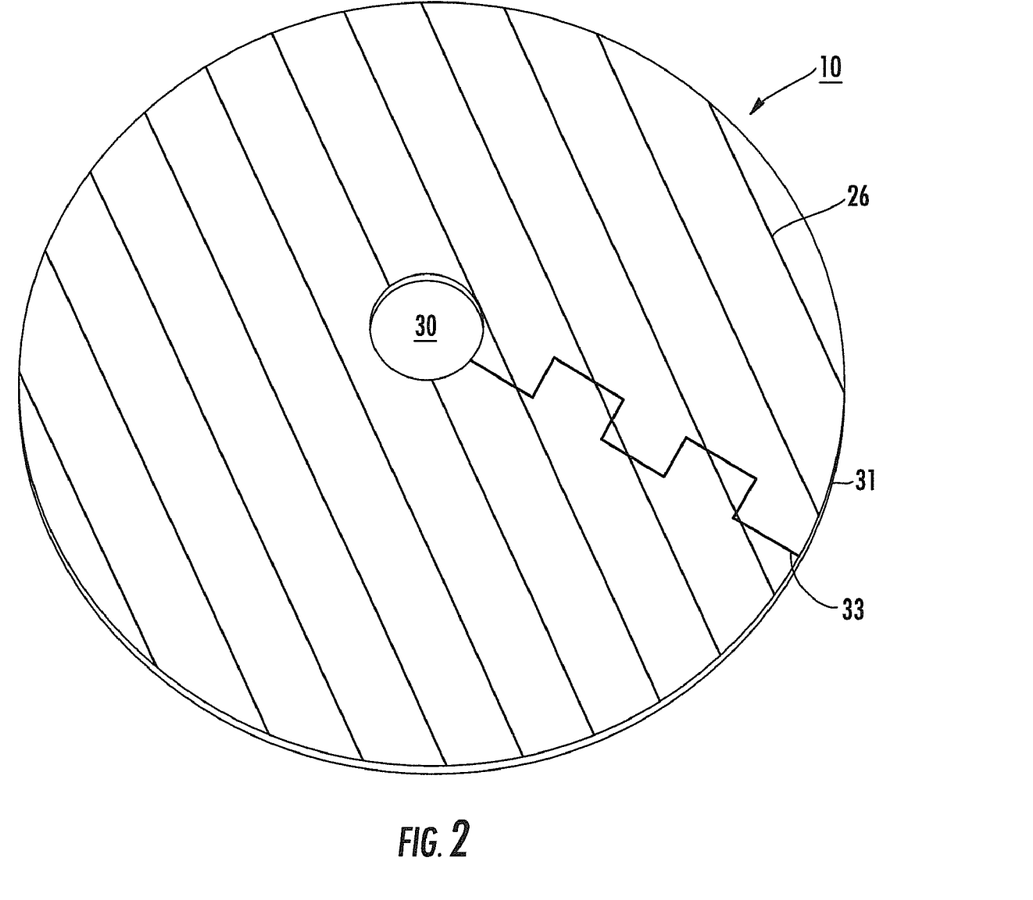
FIG. 2 is a perspective view of the ring as in FIG. 1, particularly showing a first colored surface.
Figure 3:
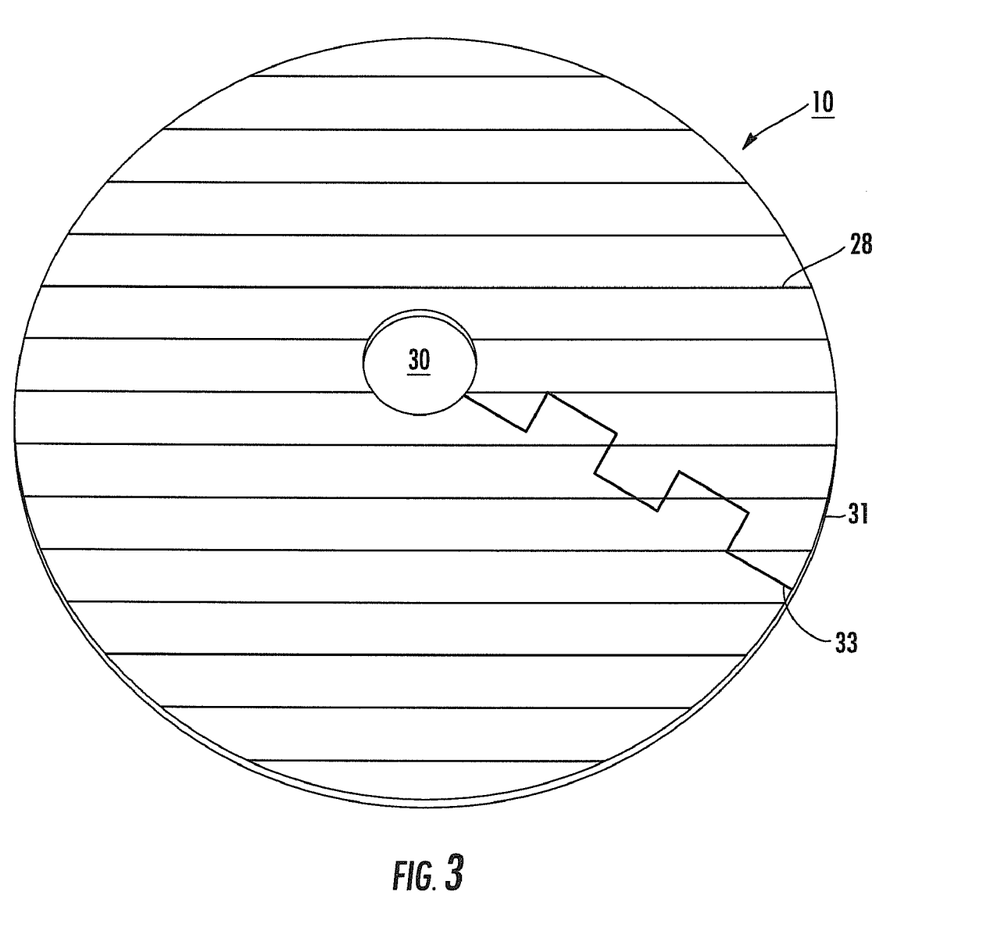
FIG. 3 is a perspective view of the ring as in FIG. 2, particularly showing a second colored surface.
Figure 4:
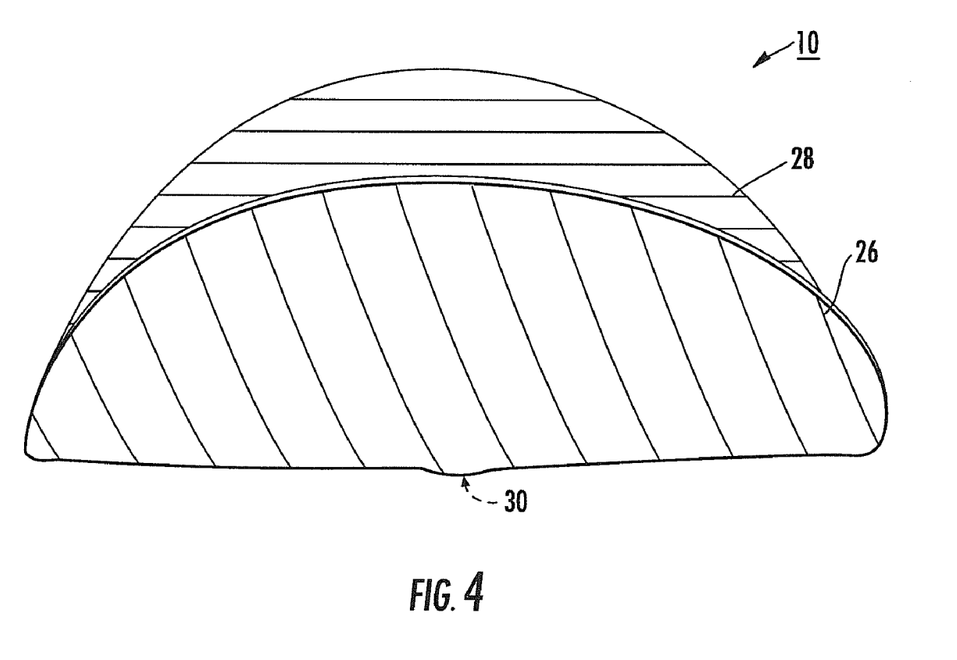
FIG. 4 is a perspective view of the ring as in FIGS. 1 and 2, particularly contrasting the first and second colored surfaces.

FIGS. 2, 3 and 4 most clearly show that the skirt 10 includes an upper or first colored surface 26 and an opposing second or lower colored surface 28. As introduced, either surface 26, 28 can engage the ground, which is simply dependent upon which color the property owner desires to display. The property owner may even wish to display one color one season then turn the skirt 10 over during the following season to display the other colored side.

In the example shown in FIGS. 2, 3 and 4, the first colored surface 26 is brown in color and the second colored surface 28 is red in color. However, a practically limitless variety of colors and color combinations are within the scope of the present disclosure, and the skirt 10 is not limited to the exemplary brown-red combination. For instance, brown-green, brown-black, red-green, red-black and numerous other color combinations and shades of colors can be provided. Also, although natural colors and color combinations that mimic tree bark, leaves, grass, rocks and the like are expected in most cases, it is conceivable that some property owners may want peculiar colors (e.g., pink, purple) to compliment a particular motif or to decorate for a special occasion; thus, the possible colors and color combinations for skirt 10 are only limited by consumer imagination. Further details regarding processes for coloring the surfaces 26, 28 are described below with respect to FIGS. 5, 6 and 7.

With continued reference to FIGS. 2, 3 and 4, the skirt 10 includes the hole 30 through which a tree trunk or post may extend as noted above with respect to FIG. 1. As shown in the example of FIGS. 2, 3 and 4, the hole 30 is formed in the center or an intermediate area of the skirt 10, but the hole 30 could be off-set to accommodate a trunk or post that is situated near a wall or other obstruction, or the skirt 10 as shown could be trimmed to fit a restricted space around the tree or post. As shown, the hole 30, like the skirt 10, is circular in shape but could be formed or cut into any suitable or desired shape such as a square, for instance, to fit neatly about a square shaped post.

FIGS. 2 and 3 also particularly show a partially precut or preformed slit 33, which in this example is cut into one of the surfaces 26, 28 of the skirt 10 but usually not into the other surface or though both surfaces. Any suitable means such as a heated wire cutter can be used to cut into one of the surfaces 26, 28 so that the slit 33 stops short of the opposing surface. Thus, the non-cut surface in the finished skirt 10 will appear to be continuous. Although the slit 33 appears in this example as interlocking teeth, the slit 33 can be a straight line or a serpentine or other tortuous shape. Further details regarding this aspect of the disclosure can be found in U.S. Pat. No. 5,396,731, the pertinent aspects of which are incorporated herein by reference thereto.

Figure 5:
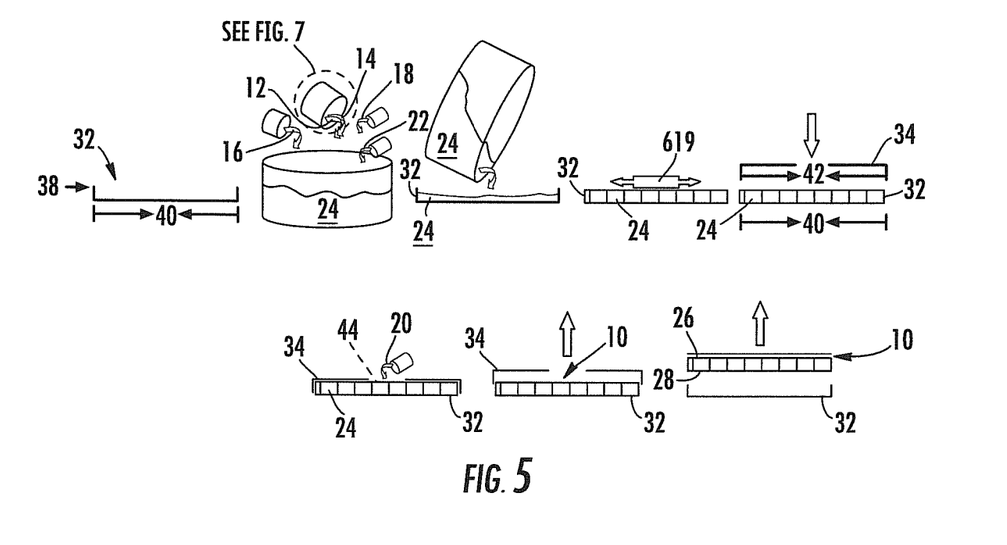
FIG. 5 is a schematic view of a manufacturing line showing a process of forming a ring having different opposing surfaces according to another aspect of the disclosure.
Figure 6:
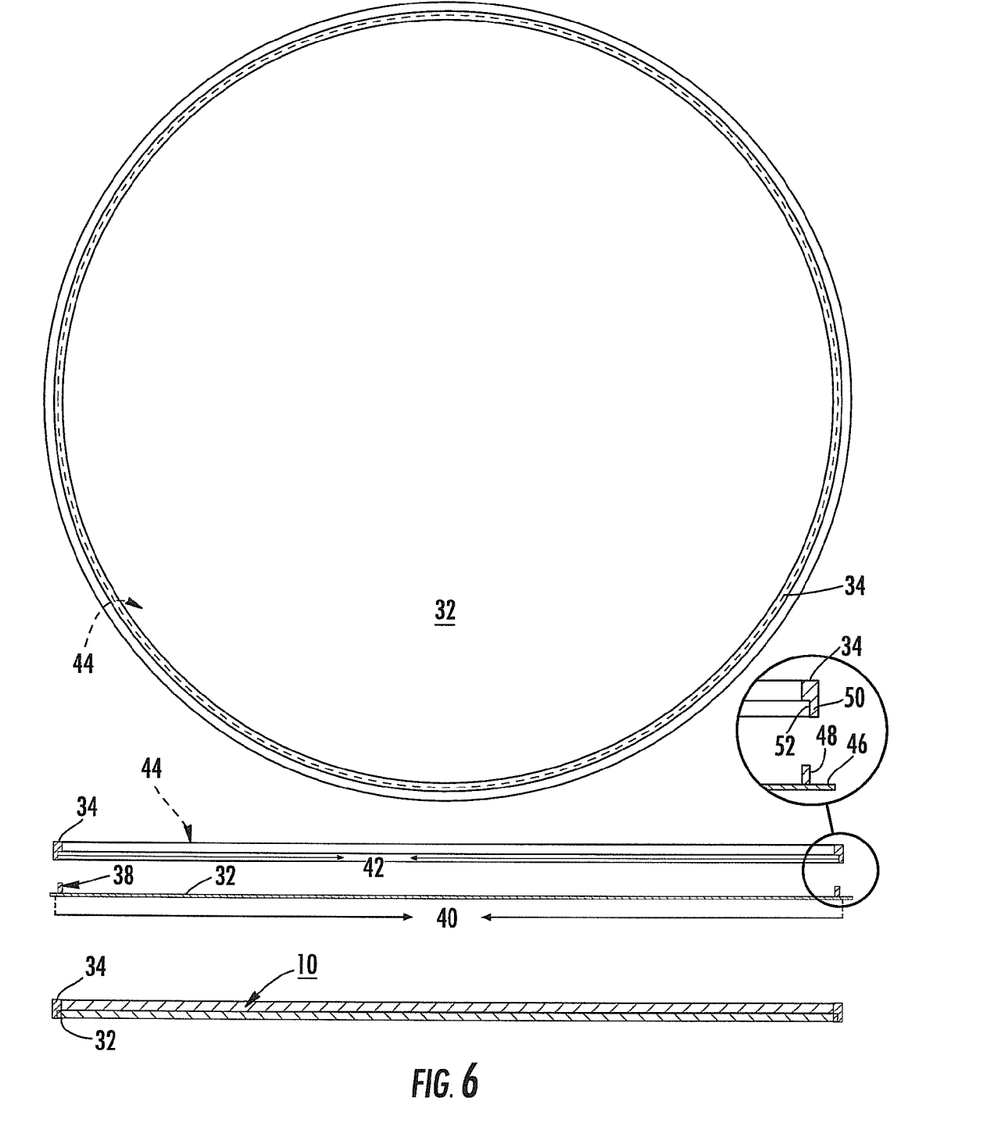
FIG. 6 are schematic views of some components of the manufacturing line as in FIG. 5 according to another aspect of the disclosure.
Figure 7:
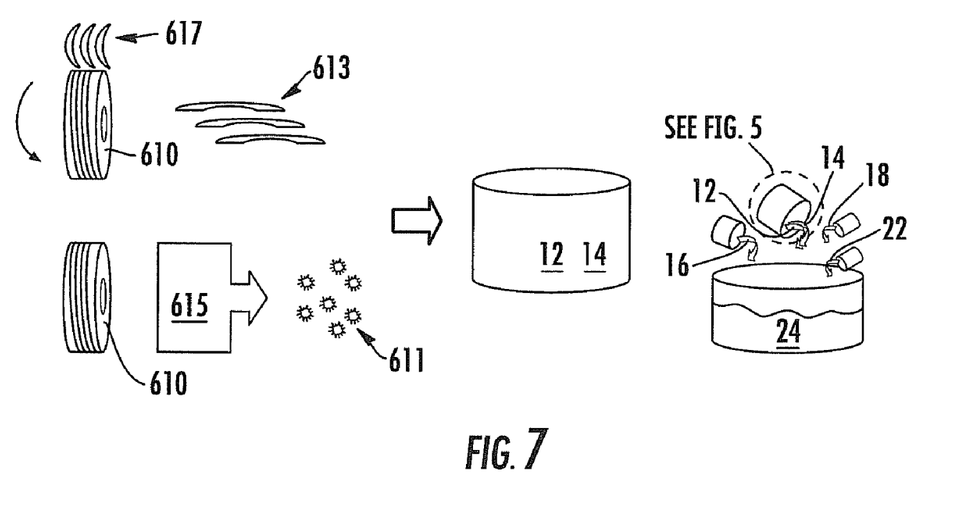
FIG. 7 is a schematic view of alternative portions of a manufacturing line as in FIG. 5 according to another aspect of the disclosure.

Turning now to FIGS. 5, 6 and 7, as briefly introduced above, the skirt 10 can be made of rubber 12, and possibly fibers 14, from used tires 610 or other rubber sources. As described in greater detail below, the rubber 12, fibers 14, a curable binder 16, one or more colors (alternatively referred to herein as coloring agents or pigments) 18, 20 and/or a catalyst 22 are mixed together to form a matrix or mixture 24 used to generate the skirt 10.

With particular reference to FIG. 5, the skirt 10 is produced in this example having a thickness ranging from about one-half inch (0.5") to about one inch (1"), although other thickness can be produced. More specifically, a ring or mold 32 is produced as shown in FIG. 5 that is half the desired thickness of the skirt 10 as dictated by a top level 38 of the mold 32. Also shown, the mold 32 has a diameter 40 that ultimately dictates a footprint or circumference of the skirt 10.

FIG. 5 further shows that the rubber 12 is mixed at a first mixing station with the fibers 14, a curable binder 16, the rubber 12, the fibers 14, the curable binder 16, the coloring agent 18 and/or a catalyst 22 to form the mixture 24. This mixture 24 is weighed and placed into the mold 32 then smoothed with a smoothing device 619, or manually leveled, substantially even with the top level 38 of the mold 32. As shown, the compacted mixture 24 is conveyed to a second mixing station where a second or top ring or section 34 having an inside diameter 42 equal to the outside diameter 40 of the mold 32 is placed over the mold 32.

FIG. 6 most clearly shows that the mold 32 may have a peripheral lip 46 from which a projection or anchor 48 projects. The top ring 34 may have a complimentary or compatible ledge or projection 50 protruding inward to define a shoulder 52. As shown, the anchor 48 and the ledge 50 seat together to seat the top ring 34 onto the mold 32.

Turning again to FIG. 5, the second color 20 is poured into the mold 32 through, for instance, a hole or opening 44 in the top ring 34 and onto the mixture 24, which has assumed the color of the first color 18. With brief reference once more to FIG. 6, the opening 44 is shown substantially equal in diameter to an inside diameter of the mold 32 to easily spread and compact the second color 20 onto the mixture 24. However, the opening 44 can be smaller such as shown schematically in FIG. 5. If the opening 44 is relatively smaller, other means such as vibration can be employed to spread the second color 20 onto the mixture 24.

As shown in FIG. 5, the second color 20 and the mixture 24 are cured. Afterwards, the top ring 34 is removed and the finished product, the skirt 10, is extracted from the mold 32. Finished rings are then packaged, such as in shrink wrap, for shipment to stores.

Alternative means of providing different colored surfaces 26, 28 include painting one or both of the surfaces 26, 28 after the mixture 24 has otherwise cured. However, paint has been found to dry around individual fibers of the skirt 10, leaving black-appearing open spaces and thus, a less natural appearance. Paint also has a tendency to chip or peel away after prolonged exposure.

Another alternative coloring means is to form two separate skirt components each having different colors. After curing, the two components are glued or heat compressed together using, for instance, a urethane bond. However, this multi-coloring alternative is more expensive than other methods described herein and may result in a lower grade product that is more susceptible to separation.

With reference now to FIG. 7, the rubber 12 in the mixture 24 can be obtained from used tires 610 in the form of granules 611 or buffings 613. As shown, the granules 611 are generally in the range of about ¼ inch to about ¾ inch in major dimension. For instance, when the used tires 610 (or retread pieces) are ground in a granulator 615, steel components are removed, leaving the rubber granules 611. If buffings 613 are desired in the final product, a buffing machine 617 is rotated about the tire 610 (or vice versa) shedding generally fingerlike buffings 613 (e.g., about 0.5 inches to about 3 inches in length and about 0.25 to about 1 inch in width). Either or both the granules 611 and the buffings 613 can be used in the mixture 24, although it has been discovered that buffings 613 provide relatively more strength and flexibility to the skirt 10.

If rayon, nylon or other such materials were used in the tires 610, the discrete fibers 14 of such materials, about one inch or less in length, may also be a byproduct of shredding, mulching, granulating or buffering the tires 610. More specifically, the general range of ratios of all skirt materials by weight is from about 9 or 10 to about 4 or 5 to 1 with the preferable ratio being about 8 to 1. The voids to solids volumetric weight ratio is about 1 to 1. All such materials may be used in the pad mixture to facilitate providing a natural mulch pad in appearance.

With reference to both FIGS. 5 and 7, the foregoing materials are mixed with the appropriate, curable binder 16 such as latex or a urethane binder. One suitable binder for use as the curable binder 16 is moisture curable, polyurethane, #2040, manufactured by the ICI Polyurethane division of ICI Americas Inc.

As noted above, desirably the final skirt 10 is mulch-like in appearance. Accordingly, color and sheen are controlled. The coloring agents 18, 20, briefly introduced above, may be an iron oxide pigment, No. 4701, manufactured by PDI of ICI Americas, Inc., or any other suitable pigment. To control sheen or gloss for a more natural-like appearance, the coloring agents 18, 20 may include an anti-gloss agent, or a separate agent such as diatomaceous silica, such as celite #499 manufactured by Manville Filtration and Minerals, may be used. The diatomaceous silica is, for instance, sprinkled on the surface of the uncured, molded pad mixture 24 to provide an anti-gloss effect. The skilled artisan will appreciate that any suitable pigment and anti-gloss additives may be used.

Finally, as shown in FIGS. 5 and 7, the catalyst 22, briefly introduced above, is used as needed. An exemplary catalyst for use as the catalyst 22 is Dabco No. T-12 manufactured by Air Products and Chemicals Company.

By way of example, the final mixture 24 by weight may be about 12 to 14% rubber granules 611; 75% to 77% rubber buffings 613; about 0 to 2% fiber 14; about 11% binder 16; about 2 to 5% coloring agent 18, 20 by weight of total binder; about 0.01 to 0.03% catalyst 22 by weight of total binder; and about negligible percent U.V. light stabilizers and anti-oxidants. Such a mixture 24, when cured, weighs about 0.65 grams per cubic centimeter, and has a solids-to-voids volumetric ratio of about 1 to 1. Of course, this ratio can be adjusted by varying the sizes of the rubber granules 611 and/or the rubber buffings 613. For example, an increase in particle size will generally provide more air volume while a decrease in particle size will generally provide less air volume. Also by way of example, the finished skirt 10 may be about 21 inches in diameter, 1 inch thick and has a 2 inch central, trunk receiving aperture 17.

In another embodiment according to the disclosure, significantly larger pads (e.g., greater than 21 inches in diameter) may be provided. However, the cured pads described above are relatively heavy, so larger pads, when handled by hand, are difficult to maneuver. Specifically, their weight makes them more difficult to handle and may cause them to more easily tear, possibly in undesirable areas. To prevent undesirable tearing, the pads can be made thicker, which increases their weight, or can be made denser, decreasing their void to solid ratio. Neither option is especially desirable; thus, to provide larger pads, another embodiment of the disclosure contemplates the use of an internal mesh layer of fiberglass, nylon, polyethylene, or the like disposed in the pad for strength. Further details regarding this aspect can be found in U.S. Pat. No. 5,396,731, the pertinent aspects of which are incorporated herein by reference thereto.

It will be appreciated that preformed skirts as described herein may be of any shape, or be pourable pads, and/or may be used in many environments around trees, plants, monuments, walks, steep banks for erosion control, etc. where mulching is desired. For instance, as briefly introduced above, FIG. 8 depicts the skirt 100 arranged about a mailbox 550, in particular its post or pole 570. As described above, the skirt 100 may be irregularly shaped to achieve a natural appearance, or the skirt 100 may have other shapes as desired by the consumer as well as opposing sides 260, 280 of different colors. Also like the foregoing embodiments, the skirt 100 prevents weed and grass growth, while passing moisture and air to underlying root systems and simultaneously insulates the underlying root systems. As described above, the skirt 100 prevents the property owner or lawn maintenance personnel from damaging the pole 570 by chipping the wood or paint with a trimmer, mower or the like.

While preferred embodiments of the invention have been shown and described, those skilled in the art will recognize that other changes and modifications may be made to the foregoing examples without departing from the scope and spirit of the invention. For instance, dimensions such as circumferences of pads and diameters of holes can be changed to accommodate various tree or post sizes. Likewise, different rubber or other durable elastomeric materials can be used to manufacture the pads described herein. It is intended to claim all such changes and modifications as fall within the scope of the appended claims and their equivalents. Moreover, references herein to "top," "bottom," "upward," "upper," "higher," "lower," "downward," "descending," "ascending," "side," "first," and "second" structures, elements, designations, geometries and the like are intended solely for purposes of providing an enabling disclosure and in no way suggest limitations regarding the operative orientation or order of the exemplary embodiments or any components thereof.

That which is claimed:

1. An elastomeric mulch pad comprising:
    a cured composite having a first layer and a second layer in continuous contact with the first layer, the first layer and the second layer each consisting of a plurality of rubber components, a binder, and a coloring agent, the binder holding the rubber components together and the first layer to the second layer, a first coloring agent being used in the first layer and a second coloring agent different from the first coloring agent being used in the second layer;
    the first layer being configured for contacting an area about an object,
    the second layer being configured for alternately contacting the area about the object; and further having
    a peripheral edge defined by the first and second layers,
    wherein the mulch pad is porous to moisture and air but is configured to inhibit growth of grass and weeds disposed under one of the layers in the area about the object.

2. The elastomeric mulch pad as in claim 1, wherein the first and second layers define a hole therethrough and wherein the mulch pad defines a slit extending from the peripheral edge to the hole, the mulch pad being configured to twist apart along the slit to position the object in the hole, the slit being rejoinable to dispose the mulch pad around the object and to exhibit a seamless appearance thereabout.

3. The elastomeric mulch pad as in claim 1, wherein the colors of the first and second coloring agents are selected from the group consisting of red, white, brown, green, blue, black, and a combination thereof, the first color being different from the second color.

4. The elastomeric mulch pad as in claim 1, wherein the first and second coloring agents are derived from a respective coloring pigment.

5. The elastomeric mulch pad as in claim 1, wherein the first and second layers are configured to be cured together in a mold.

6. An elastomeric mulch pad consisting of:
    a first layer of rubber components, a binder, and a first coloring agent, the first layer being configured for contacting an area about an object;
    a second layer of rubber components, the binder, and a second coloring agent, the second coloring agent being different from the first coloring agent, the second layer being in continuous contact with the first layer, and the second layer being configured for alternately contacting the area about the object;
    wherein the binder holds the rubber components together and the first layer to the second layer; and
    wherein the first and second layers define a hole therethrough, a peripheral edge, and a slit extending from the peripheral edge to the hole, the mulch pad being configured to twist apart along the slit to position the object in the hole.

7. The elastomeric mulch pad as in claim 6, wherein the first and second coloring agents are derived from a respective coloring pigment.

8. The elastomeric mulch pad of claim 7, wherein the colors of the first and second coloring agents are selected from the group consisting of red, white, brown, green, blue, black, and a combination thereof, the first color being different from the second color.

9. The elastomeric mulch pad of claim 6, wherein the rubber components are selected from the group consisting of rubber buffings, rubber granules, and combinations thereof.

10. The elastomeric mulch pad of claim 6, wherein a majority of the rubber components in the first layer are rubber buffings, and a majority of the rubber components in the second layer are rubber buffings, the first layer and the second layer having different colors.

11. The elestomeric mulch pad of claim 10, wherein the rubber buffings are about 0.5 inches to about 3 inches in length and about 0.25 inches to about 1 inch in width.

12. The elastomeric mulch pad of claim 6, wherein a majority of the rubber components in the first layer are rubber buffings, and a majority of the rubber components in the second layer are rubber granules, the first layer and the second layer having different textures.

13. The elastomeric mulch pad of claim 6, wherein the mulch pad is a circular-shaped skirt or a star-shaped skirt.

14. The elastomeric mulch pad of claim 6, wherein the object is one of a tree, a shrub, a post, and a pole.

* * * * *